(12) United States Patent
Harris et al.

(10) Patent No.: US 7,942,009 B1
(45) Date of Patent: May 17, 2011

(54) GAS TURBINE ENGINE WITH AN AIR COOLED BEARING

(75) Inventors: Mark M Harris, Palm Beach Gardens, FL (US); Wesley D Brown, Jupiter, FL (US); Angel M Garcia, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 201 days.

(21) Appl. No.: 12/484,503

(22) Filed: Jun. 15, 2009

Related U.S. Application Data

(62) Division of application No. 11/219,617, filed on Sep. 3, 2005, now Pat. No. 7,562,519.

(51) Int. Cl.
*F02C 6/08* (2006.01)
*F02C 7/12* (2006.01)

(52) U.S. Cl. .......................... 60/782; 60/806
(58) Field of Classification Search ............. 60/39.08, 60/782, 785, 806; 384/476, 317, 318, 321, 384/900
See application file for complete search history.

(56) References Cited

U.S. PATENT DOCUMENTS

| | | | | |
|---|---|---|---|---|
| 2,479,573 | A * | 8/1949 | Howard | 60/39.37 |
| 3,200,580 | A * | 8/1965 | Millar | 60/605.3 |
| 3,898,793 | A * | 8/1975 | Nakamura et al. | 60/39.08 |
| 4,000,608 | A * | 1/1977 | Chute | 60/804 |
| 4,156,342 | A * | 5/1979 | Korta et al. | 60/39.08 |
| 5,526,640 | A * | 6/1996 | Brooks et al. | 60/804 |
| 6,966,191 | B2 * | 11/2005 | Fukutani et al. | 60/785 |
| 2005/0235651 | A1 * | 10/2005 | Morris et al. | 60/782 |

* cited by examiner

*Primary Examiner* — Michael Cuff
*Assistant Examiner* — Gerald L Sung
(74) *Attorney, Agent, or Firm* — John Ryznic

(57) ABSTRACT

A small gas turbine engine with a compressor, a combustor, and a turbine located downstream of the combustor. The compressor and turbine are supported on a rotary shaft, and a main bearing is support on the rotary shaft, the main bearing being located in a hot zone of the combustor. The main bearing includes cooling air passages within the races to provide cooling for the bearing. A cooling air is diverted from the compressor and passed through the bearing cooling passages for cooling the bearing, and then the cooling air is directed into the combustor. The cooling air is also passed through a guide nozzle before being passed through the bearing to cool both the guide nozzle and the bearing. A swirl cup injector is sued to deliver the compressed air from the compressor and the cooling air from the bearing into the combustor, the swirl cup injector also acting to draw the cooling air through the bearing.

5 Claims, 4 Drawing Sheets

FTT-147D   sheet 2 of 3

GAS TURBINE ENGINE WITH AN AIR COOLED BEARING

CROSS-REFERENCE TO RELATED APPLICATIONS

This application is a Divisional of co-pending U.S. Regular application Ser. No. 11/219,617 filed on Sep. 3, 2005.

GOVERNMENT LICENSE RIGHTS

The U.S. Government has a paid-up license in this invention and the right in limited circumstances to require the patent owner to license others on reasonable terms as provided for by the terms of Contract No. W31P4Q-05-C-R003 awarded by the US Army.

BACKGROUND OF THE INVENTION

1. Field of the Invention

The present invention relates to compact, expendable gas turbine engine, and more specifically to a gas turbine engine having a rear-mounted main bearing that is cooled by air supplied by the compressor, the air then being discharged into the combustor for mixing with the fuel.

2. Description of the Related Art Including Information Disclosed Under 37 CFR 1.97 and 1.98

Small gas turbine engines of the kind used in Unmanned Air Vehicles (UAV) such as a small cruise missile or drone are well known in the art. These turbines produce a thrust from less than 100 lbs to several hundred lbs. Because these turbine engines must fit within a small space, they tend to be very compact and run at high rotational speeds. One problem with prior art small gas turbine engines is the location of at least one of the main bearings that support the rotor shaft. It is preferred to locate one of the main bearings near the compressor and another of the main bearings near the turbine or combustor exit. However, the bearing near the combustor exit is exposed to very high temperatures.

Another problem with these small engines is the lack of space for storage of a bearing lubrication. These small engines must have a long storage life, and be ready to operate on a short notice. Consequently, bearings must run with little or no lubrication. Fuel lubrication, dry lubrication and grease packed bearings are typical.

To overcome this problem, the prior art small gas turbine engines locate the two bearings in the front portion of the compressor such as shown in US Patent Application Publication No. 2004/0216445 A1 entitled Combined Stage Single Shaft Turbofan Engine by Jones et al published on Nov. 4, 2004. The advantage of locating the bearings away from the hot combustor section of the turbine is that the bearings are cooler and easily lubricated, and the rotor can be a single rotor module that can be balanced as built. The disadvantages are the heavy overhung mass that results in rotor dynamics problems, slow starting, and little combustor space. Bearing lube (typically fuel) passes into the engine flow path, but no more than half can burn since it does not enter the combustor in the right place. This bearing arrangement is also limited to low bearing air flows.

U.S. Pat. No. 5,727,378 entitled Gas Turbine Engine issued to Seymour on Mar. 17, 1998 shows a small gas turbine engine in which the main bearings are located forward of the turbine and combustor, but with the rear-most bearing located between the compressor outlet and the turbine inlet, in which a portion of the compressor outlet is directed over an end plate that forms a passage for cooling air. The diverted portion of air from the compressor thus provides cooling for the rear-most bear, but the air does not pass through the bearing, and the air is discharged into the turbine downstream of the combustor. This non-contact cooling air does not provide adequate cooling for the present invention, and wastes the compressed air by discharging it into the turbine without producing any power.

U.S. Pat. No. 5,526,640 issued to Brooks et al on Jun. 18, 1996 entitled Gas Turbine Engine Including A Bearing Support Tube Cantilevered From A Turbine Nozzle Wall shows a gas turbine engine with a bearing support tube and two main bearings, where both fuel and air are passed through the bearing support tube to cool and lubricate both bearings. However, the air flow through the tube is very low, and all of the fuel supplied to the combustor is delivered through the tube. The low air flow of the Brooks et al invention does not provide adequate cooling or conditioning for the bearings exposed to high temperatures from the combustor, and the large amount of fuel used for lubricating requires seals and other added structure for the bearings to prevent fuel from leaking.

U.S. Pat. No. 3,381,471 issued to Szydlowski on May 7, 1968 and entitled Combustion Chamber For Gas Turbine Engines shows a nozzle located between the combustor and the turbine, and where a portion of the compressor discharge is directed around the back end of the combustor and through the nozzle to cool the nozzle, the air flow through the nozzle then being directed into the combustor for burning. Szydlowski does not use any air flow to cool a bearing.

BRIEF SUMMARY OF THE INVENTION

It is therefore a principal object of the present invention to provide for a small gas turbine engine having a small size that will fit within a small space in a UAV. It is further object of the present invention to provide for a small gas turbine engine with improved fuel efficiencies and low weight in order to increase the range and loiter time of the UAV. It is another object of the present invention to provide for a small gas turbine engine that has a long storage life and that does not require lubrication of the bearings. It is an additional object of the present invention to provide for a small gas turbine engine with a main bearing located near the turbine in order to provide a more stable bearing support for the gas turbine engine. These objects and others will be described below in the detailed description of the invention and the accompanying drawings.

The first embodiment of the present invention is, a small gas turbine engine used in a cruise missile or UAV in which space is limited, in which a main bearing is located near the combustor and turbine portion of the engine that is exposed to the high temperatures of the engine, in which the cooling air for the bearing (being a substantial fraction of the total engine air flow) is diverted from the compressor and directed through the bearing to maintain the inner and outer races at similar temperatures, the cooling air then being redirected into the combustor for burning therein. The cooling air diverted from the compressor is also passed through the turbine nozzles to cool them before passing into the bearing. By cooling the bearing, the inner and outer races are maintained at similar temperatures to avoid loss of radial clearance during operation.

The combustor can be configured without wall cooling skirts or holes by using backside cooling which maximizes the volume for burning. Wall cooling is achieved via external convection, and/or near-wall protective and thermal barrier coatings as required. The combustor may have wall cooling where required. If external convection is not adequate, then the preferred wall cooling method is "effusion" (closely spaced, angled, small holes through the liner walls).

DETAILED DESCRIPTION OF THE INVENTION

Figure 5:
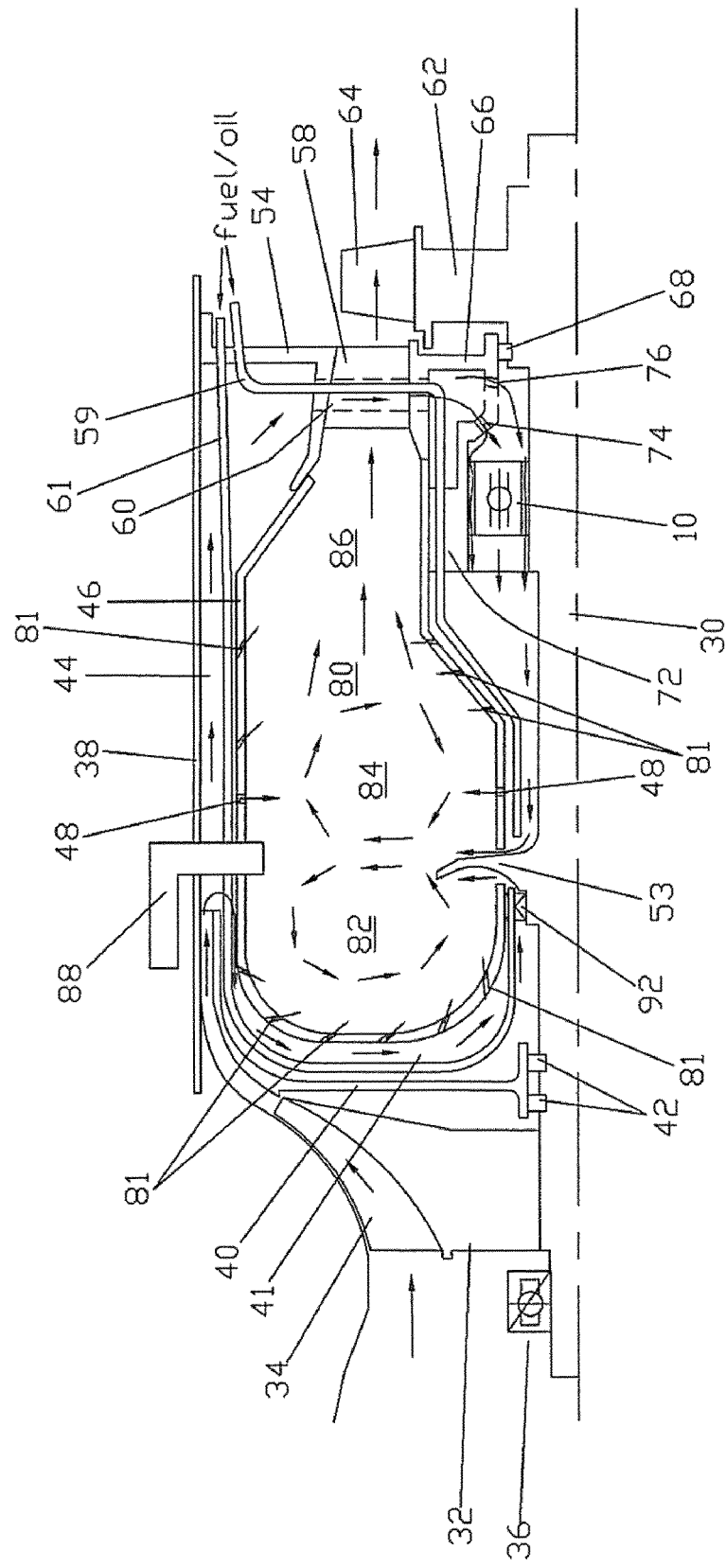
FIG. 5 shows a cross section view of a gas turbine engine of the present invention with the cooling air flow paths through the bearing of the present invention with a rotary cup injector dividing primary and secondary burn, zone air flows.
Figure 6:
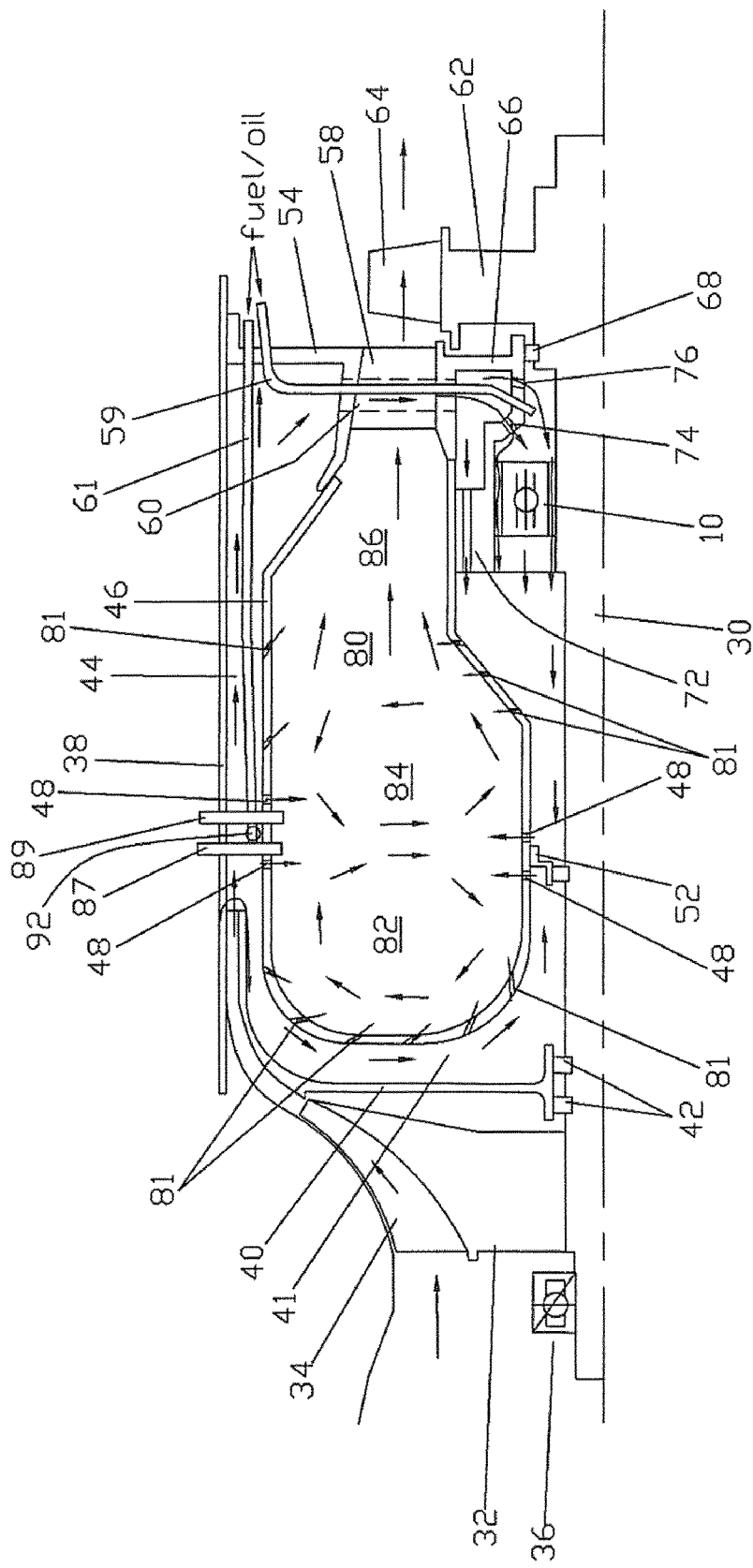
FIG. 6 shows a cross section view of a gas turbine engine of the present invention with the cooling air flow paths through the bearing of the present invention with a seal member dividing primary and secondary burn zone air flows.

The present invention is a small gas turbine engine primarily used in Unmanned Arial Vehicles (UAV) such as a small cruise missile or drone in which a rear bearing used to support the rotor shaft and located in the hot section of the turbine is cooled with cooling air diverted from, the compressor, the cooling air passing through the bearing inner and outer races to maintain the races at similar temperatures to prevent radial clearance from developing in the bearing, the cooling air then being discharged into the combustor to be burned with fuel. FIGS. 1-4 show the preferred embodiment of the bearing used in the present invention. FIGS. 5 and 6 show two embodiments of the gas turbine engine that uses the bearing of FIGS. 1-4. The structure of the bearing will be described first.

Figure 1:
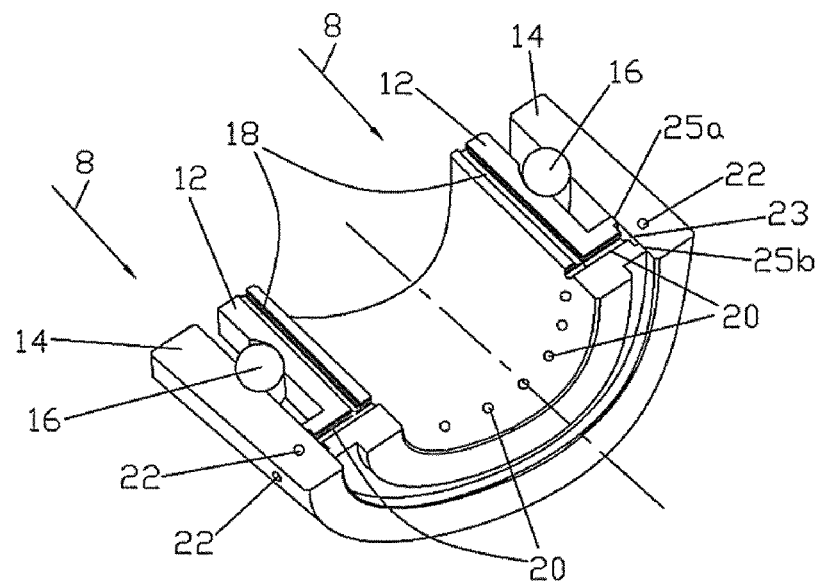
FIG. 1 shows a three dimensional view of a cross section through half of the bearing in a plane parallel to a rotational axis of the bearing.

FIG. 1 shows the bearing in a three dimension view of a cross sectional of the bearing with an inner race 12, an outer race 14, a roller ball 16, an inner race longitudinal cooling passage 18, an inner race radial cooling passage 20, and an outer race swirl passage 22. An annular entrance chamber 23 is formed on the radial outer end of the inner race radial cooling passages 20, the annular chamber 23 forming an annular passage around the perimeter of the inner race. On the sides of the annular chamber 23 are projections that form a seal 25a and 25b between the inner ace 12 and the outer race 14. The annular chamber 23 receives the air flow from the outer race swirl passages 22. The present invention shows the annular chamber as part of an extension on the inner race 12. However, the annular chamber could be on a projection extending from an inside surface of the outer race 14 and forming two sealing surfaces against a surface of the inner race.

Figure 2:
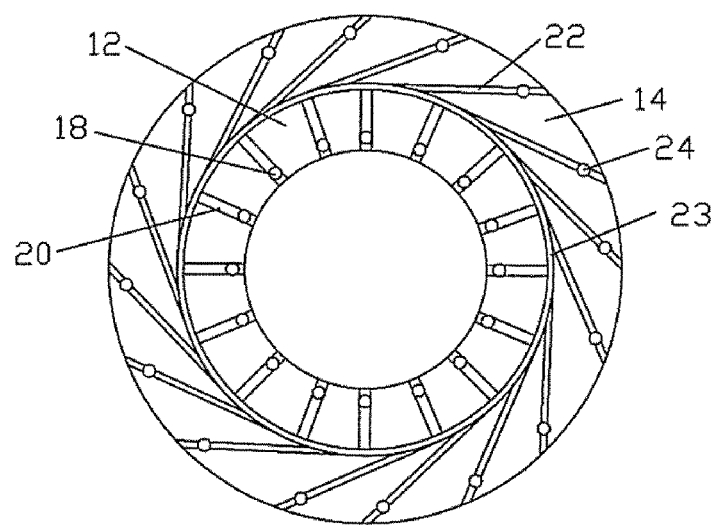
FIG. 2 shows a sectional view of the bearing along the axis of rotation and parallel to a plane passing through the cooling passages in the radial directions.

FIG. 2 shows cross sectional views of the bearing with the inner race 12 and the outer race 14, the inner race longitudinal cooling passages 18 and the inner race radial cooling passages 20, outer race longitudinal cooling passages 24, and the outer race swirl cooling passages 22. The annular chamber 23 is located on the outer side of the inner race 12, and the inner race radial passages 20 lead into the annular chamber 23.

Figure 3:
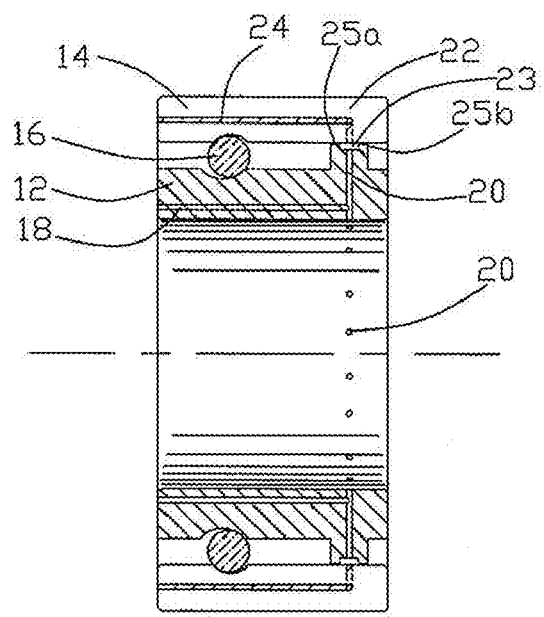
FIG. 3 shows a sectional view of the bearing half in a plane parallel to the axis of rotation of the bearing.

FIG. 3 shows the bearing with the inner race 12 and the outer race 14, and the cooling fluid passages therein. Cooling air enters the outer race longitudinal passages 24, flows into the outer race radial passages 22 toward the annular chamber 23, into the inner race radial passages 20, and then into the inner race longitudinal passages 18, providing a cooling or conditioning thermal fluid to both races.

The roller balls 16 are made of ceramic silicon nitride to reduce the centrifugal loads due to their lower density compared to steel. Roller balls of this material have a high hardness which results in excellent wear resistance and longer life for the bearing. The outer race 14 and inner race 12 are made of materials such as 440C which are tempered at 600 degrees F. and above, or Stellite 6B and MP159 which allows for a long shelf life after storage in a humid environment without rusting.

The bearing of the present invention uses no cage to retain the roller balls. Eliminating the cages reduces the friction, reduces heat generation, and increases bearing life. Elimination of the cages removes the bearing cage failure mode entirely. The bearing internal clearance is in the range of 0.0005 inches to 0.0012 inches. The cooling passages in the races are arranged to cool or condition both races to about the same temperature. If the inner race reaches a temperature much higher than the temperature of the outer race, the distance between contact points for the roller balls on the races will decrease, and the stress will increase, leading to faster wear. If the inner race temperature becomes much lower than the outer race temperature, then the bearing contact distance increases, resulting in excessive contact angles and non-ideal bearing stiffness. The pre-swirl cooling passages 22 in the outer race are angled with respect to the rotational axis of the bearing from zero degrees to about 30 degrees, and preferably in the range from 10-20 degrees.

The concept here is to pre-swirl the cooling air to a tangential velocity approximately equal to the tangential velocity of the bearing's inner race. This ensures that the inner race receives a lower relative temperature for cooling than the outer ring, providing effective clearance control. Additional cooling can be achieved by vortexing to the inner ring passages 18 through the radial passages 20. An entrance chamber 23 is formed at the beginning of the inner race radial passages 20. Leakage of cooling air can be reduced by controlling the gap clearances (25a, 25b) to within a range of 0.001 inches to 0.0002 inches. By providing cooling air to both the inner and outer race of the bearing, the temperature difference of the races remains within an acceptable limit to prevent radial clearance from developing between the two races due to temperature differences. A radial clearance beyond a certain limit will cause the bearing assembly to quickly destroy itself.

In operation, the bearing is mounted in an engine in which air 8 flows toward the bearing 10 as seen in FIG. 1. Portions of this air 8 will enter the outer ace longitudinal passages 24 and flow toward the outer race swirl passages 22. The outer race 14 is non-rotating since it is secured to the engine casing. The airflow in the outer race swirl passages 22 as seen in FIG. 2 flows toward the inner race in a direction tangential to the inner race. The airflow from the outer race swirl passage 22 then flows into annular chamber 23, and then into the inner race radial passages 20, and from the inner race radial passages 20 into the inner race longitudinal passages 18 and out from the bearing 10 in an opposite direction to the original airflow 8. The outer race swirl passages 22 are set at such an angle that the airflow through these passages increases in tangential velocity to approximately the wheel speed of an outer surface of the inner race. This increased tangential velocity of the air flow will produce a drop in the temperature of the cooling air (due to a conservation of energy), and therefore provide a higher thermal difference between the inner race of the bearing and the cooling air. Thus, a more effective cooling takes place. When the bearing is mounted in the casing and on the rotating shaft, radial passages 20 and swirl passages 22 are blocked by the shaft and the casing to prevent air flow from passing out these openings. The openings of longitudinal passages 24 and 18 are left open to allow airflow into and out of these passages.

The number of passageways and size of the passageways can vary depending on the cooling requirements of the bearing. Larger passageways will allow for greater volume of cooling fluid. So would an increase the number of passageways. However, using larger size or greater number of passageways could decrease the rigidity of the races.

The bearing life is increased by providing for a special coating on the races. A coating of Tungsten Disulfide or Titanium Sulfide is applied which reduces the coefficient of friction compared with oil, and also reduces heat generation in the bearing. This coating also acts as a self-lubricant for the bearing rolling contact surface. Grease with a grease retainer can also be applied to the bearing to add additional lubrication. Suitable commercially available grease is DSF-5000 available from Schaefer Mfg. Co., of St. Louis, Mo. 63104. Also, a combination of fuel and oil, oil only, or fuel only, or VPL can also be used for lubricating the bearing.

Figure 4:
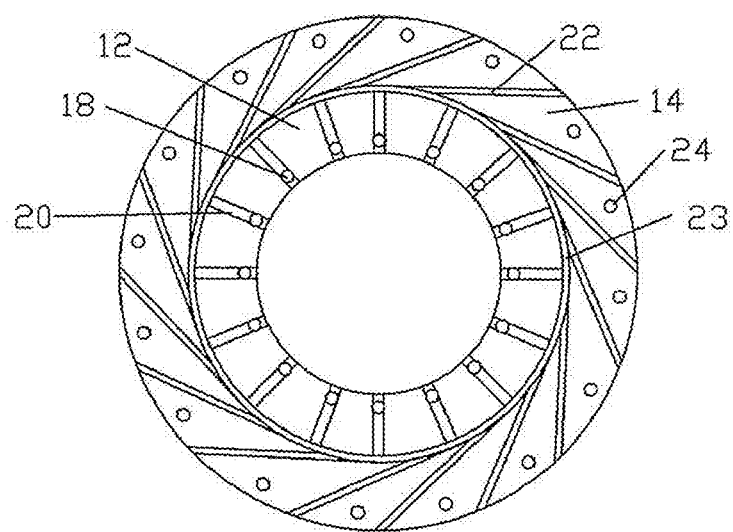
FIG. 4 shows a second embodiment of the present invention in which the cooling holes 24 do not intersect with the cooling holes 22 as in the first embodiment.

A second embodiment of the bearing of the present invention is shown in FIG. 4 in which the longitudinal cooling passages 24 in the outer race 14 does not intersect or make a fluid connection to the radial and tangential cooling holes 22 as is shown in the first embodiment and in FIG. 2. In the second embodiment, the outer race would be mounted such that the openings of the cooling holes 22 are not blocked in order to allow for cooling fluid to enter the cooling passages 22. The second embodiment of FIG. 4 operates in the same way as described with respect to the first embodiment.

FIG. 5 shows the gas turbine engine with the bearing of FIGS. 1-4 used therein. The gas turbine engine includes a rotor shaft 30, a compressor disc 32, a compressor blade 34, a front bearing 36 to rotatably support the rotor shaft 30, a front side wall 40 to separate the compressor section from the combustor section, a forward air flow passage 41, a front side wall shaft seals 42 to seal the rotor shaft 30 from the front side wall 40, a turbine engine casing 38, a bypass flow passage 44, a combustor wall 46, combustor air supply passages 48, a turbine guide nozzle outer shroud and support 54, a turbine guide nozzle 58, a turbine nozzle inner shroud 66, a turbine rotor disc 62, a turbine blade 64, a turbine inner shroud seal 68 to seal the inner shroud 66 and the rotor shaft 30, cooling air supply holes 74 and 76, a rear combustor support member 72, a combustor 80, a primary burn zone 82, a secondary burn zone 84, combustor cooling air supply holes 81, a rotary cup fuel injector 53, a swirl vane 92 to maintain a prescribed swirl angle for the compressed air delivered to the combustor, and a rear support bearing 10 located in the hot zone of the engine near the combustor exit and the turbine section. For the purpose of this disclosure and any claims based upon this disclosure, the meaning of the terms hot zone with respect to the bearing 10 and the turbine or combustor is defined to include any area near the combustor and turbine that is hot enough to prevent the use of a bearing like one used in the other parts of the engine that are not effected by the extreme hot temperatures of the gas stream being discharged from the combustor and into the turbine. Fuel is delivered to the rotary cup injector through fuel lines 59 and/or 61. Fuel line 59 delivers fuel from a location rearward of the engine through the guide nozzles 58, through the combustor and bearing support 72, and into the combustor downstream from the rotary cup injector 53. Fuel line 61 delivers fuel from a rearward location of the engine, through the bypass channel 44, through the air flow passage 41, and into the combustor upstream of the rotary cup injector 53. In an alternate embodiment, fuel line 61 can originate from a front end of the engine, entering the part shown in FIG. 5 from just above the impeller 34 and into the passage 41 toward the swirl cup injector. The rotary cup injector includes parabolic surfaces on both sides to produce a film flow of the fuel on the injector surfaces that promotes droplets of fuel for ease in burning.

The airflow through the engine and bearing 10 is shown by the arrows in FIG. 5. Air is compressed by the compressor and delivered to the bypass channel 44 and the forward inlet of the combustor 80 located between the front side wall 40 and a forward portion of the combustor 80, through the swirl guide members 92, and into the rotary cup fuel injector 53. Some of this air is supplied to the various cooling holes 81 located in the combustor 80 at an angle as shown, in FIG. 5. Some of the bypass air is supplied to the combustor air supply passages 48 for delivery to the combustor for burning with the fuel. The combustor air supply holes 48 are located at a certain position in the combustor at an angle to deliver the compressed air toward a point in the combustor where the primary burn zone and the secondary burn zone meet. The combustor cooling air supply holes 81 are positioned about the combustor and at such an angle to inject the cooling air along the inner wall of the combustor and at such an angle to promote the swirl direction of the burn zones as shown in FIG. 5 with respect to the arrows representing the air flow paths.

A portion of the bypass air flow is diverted through the hollow section 60 of the guide nozzles 58 located downstream from the combustor exit and upstream of the turbine blades 64. The guide nozzles 58 perform the well known function of guiding the combustor exhaust gas stream onto the turbine blades 64. The air flow acts to cool the guide nozzles. The air flow through the guide nozzles 58 then passes through cooling holes 74 and 76 in the inner shroud 66 and into the rear bearing 10.

The rear bearing 10 includes a plurality of cooling air passages in the inner race and the outer race as described in FIGS. 1-4 above. The cooling air passes through the bearing, and then into the combustor through the rotary cup injector to be burned with the fuel in the combustor. Some of this air flow from the bearing is used to pass through combustor cooling holes 81 to cool the inside surface of the combustor, and some of the air flow is supplied through the combustor air supply passage 48 located just upstream of the rotary cup injector 53. The location and direction of airflow through the combustor air supply holes 48 in this section of the combustor 80 is such to promote the swirl directions of the secondary burn zone 84 shown in FIG. 5.

Rotation of the rotary cup injector 53 of the present invention provides fuel break-up and allows for a low pressure gradient (compared to the higher pressure supplied by the compressor) to promote air flow from the compressor outlet and through the two air supply paths leading into the combustor 80 from the points upstream of the rotary cup injector and from the point downstream of the rotary cup injector (which passes through the guide nozzles 58 and the bearing 10) as well as injecting the fuel into the two burn zones of the combustor 80. Because of its fuel break-up efficiency, the rotary cup injector allows for the fuel feed pressure to be maintained at the lowest possible level.

Passing a portion of the air flow from the compressor into the bearing, as described above acts to cool the bearing races such that no significant thermal temperature difference between the inner race and outer race of the bearing develops (which can cause radial spacing between the two race surfaces to increase), and therefore prevents the bearing from breaking apart. Passing the cooling air from the bearing back into the combustor improved the performance by not ejecting the heated cooling air out of the engine. Thus, the engine efficiency is kept high.

FIG. 6 shows a second embodiment of the air cooled bearing arrangement for the small gas turbine engine. The same reference numerals, that appear in the FIG. 5 embodiment are for the same members in the FIG. 6 embodiment. In the FIG. 6 embodiment, the rotary cup injector 53 of the first embodiment is not used. In place for the rotary cup injector is a seal member 52 that produces an air flow seal between the airflow passing around the front section of the combustor 80 and the airflow passing through the guide nozzles 58 and the rear bearing 10. The seal member 52 prevents mixing of these two air flows and forces these two airflows into the two burn zones 82 and 84 of the combustor 80 as does the rotary cup injector 53 of the first embodiment. In the second embodiment of FIG. 6, because no rotary cup injector is used to deliver the fuel into the combustor 80, some of the fuel is delivered through the fuel line 59 into the air flow passage upstream of the bearing 10. Injecting the fuel at this location also acts to cool and lubricate the bearing 10. The fuel is mixed with the air flow and then directed into the secondary burn zone 84 of the combustor 80 through air supply passages 48 in the combustor wall. A primary zone fuel supply tube 61 delivers fuel to the primary burn zone 82 at a point 92 on the outer wall of the combustor to be mixed with the air flow from the compressor. This fuel feeds both the primary and secondary burn zones.

The present invention therefore discloses two embodiments for a small gas turbine engine that uses a bearing located in the rear portion of the engine near the combustor exit and the turbine portion of the engine that represents the highest temperature region of the turbine engine. Locating one of the two main rotor shaft bearings in this location—as opposed to locating both main bearings forward of the compressor as disclosed in the Patent Application Publication US 2004/0216445 A1—allows for a better rotary support structure for the rotary shaft while providing necessary cooling for the bearing to allow for the bearing to be located in this region of the engine. Providing for a higher rate of air flow through the bearing (7%-20% of the compressor discharge flow in the present invention) also provides enough air flow to adequately cool and control the bearing race clearance as opposed to the Brooks et al U.S. Pat. No. 5,526,640 invention that uses a very small amount of air to cool the bearing, and also uses fuel to cool the bearing which results in a more complex bearing structure by requiring seals because of the fuel flow. An improved small gas turbine engine is therefore possible using the air cooled bearing of the disclosed present invention.

We claim the following:

1. A process for operating a gas turbine engine, the gas turbine engine comprising a compressor and a turbine rotatably secured to a rotor shaft, an annular combustor positioned between the compressor and the turbine, and an aft end roller bearing to support the aft end of the rotor shaft, the process comprising the steps of: passing compressed air from the compressor around the forward end and the aft end of the combustor to provide convection cooling of outer walls of the combustor; passing at least 10 percent of the compressed air through a plurality of first stage guide nozzles to cool the nozzles; passing the cooling air from the guide nozzles through the roller bearing to cool the roller elements and inner and outer races of the roller bearing; and, discharging all of the cooling air from the roller bearing into the combustor for combustion.

2. The process for operating a gas turbine engine of claim 1, and further comprising the step of:
providing a plurality of pre-swirl passages within the outer race of the roller bearing so that rotation of the outer race forces the cooling air through the roller bearing.

3. The process for operating a gas turbine engine of claim 1, and further comprising the steps of:
injecting fuel into the aft roller bearing to provide both cooling and lubrication for the bearing.

4. The process for operating a gas turbine engine of claim 3, and further comprising the step of:
injecting the cooling air and the fuel passing through the aft roller bearing into the combustor by slinging the air and fuel from an aft face of a rotary cup injector.

5. The process for operating a gas turbine engine of claim 1, and further comprising the step of:
enclosing the combustor with an enclosure such that a narrow cooling air passage is formed around the combustor to produce a high velocity flow of the cooling air over the combustor.

\* \* \* \* \*